United States Patent [19]

York

[11] 4,412,807
[45] Nov. 1, 1983

[54] OFFSET FLOW INJECTION NOZZLE
[75] Inventor: Stuart A. York, Tariffville, Conn.
[73] Assignee: The Continental Group, Inc., Stamford, Conn.
[21] Appl. No.: 343,148
[22] Filed: Jan. 28, 1982
[51] Int. Cl.³ .............................................. B29F 1/05
[52] U.S. Cl. .................................................. 425/564
[58] Field of Search ................................ 425/564–566
[56] References Cited
FOREIGN PATENT DOCUMENTS
712256  1/1980  U.S.S.R. .............................. 425/564

Primary Examiner—Thomas P. Pavelko
Attorney, Agent, or Firm—Charles E. Brown

[57] ABSTRACT

This relates to an injection nozzle which is provided with a valve gate pin for selectively interrupting plastic flow therethrough. The internal construction of the nozzle is such that the plastic flowing therethrough for injection into an injection mold is uninterrupted and in no way divided so that there will be a separation of the plastic and a rejoining in a manner which will provide for a welded interface. The valve gate pin, notwithstanding the uninterrupted flow passage, is fully supported throughout its length.

8 Claims, 2 Drawing Figures

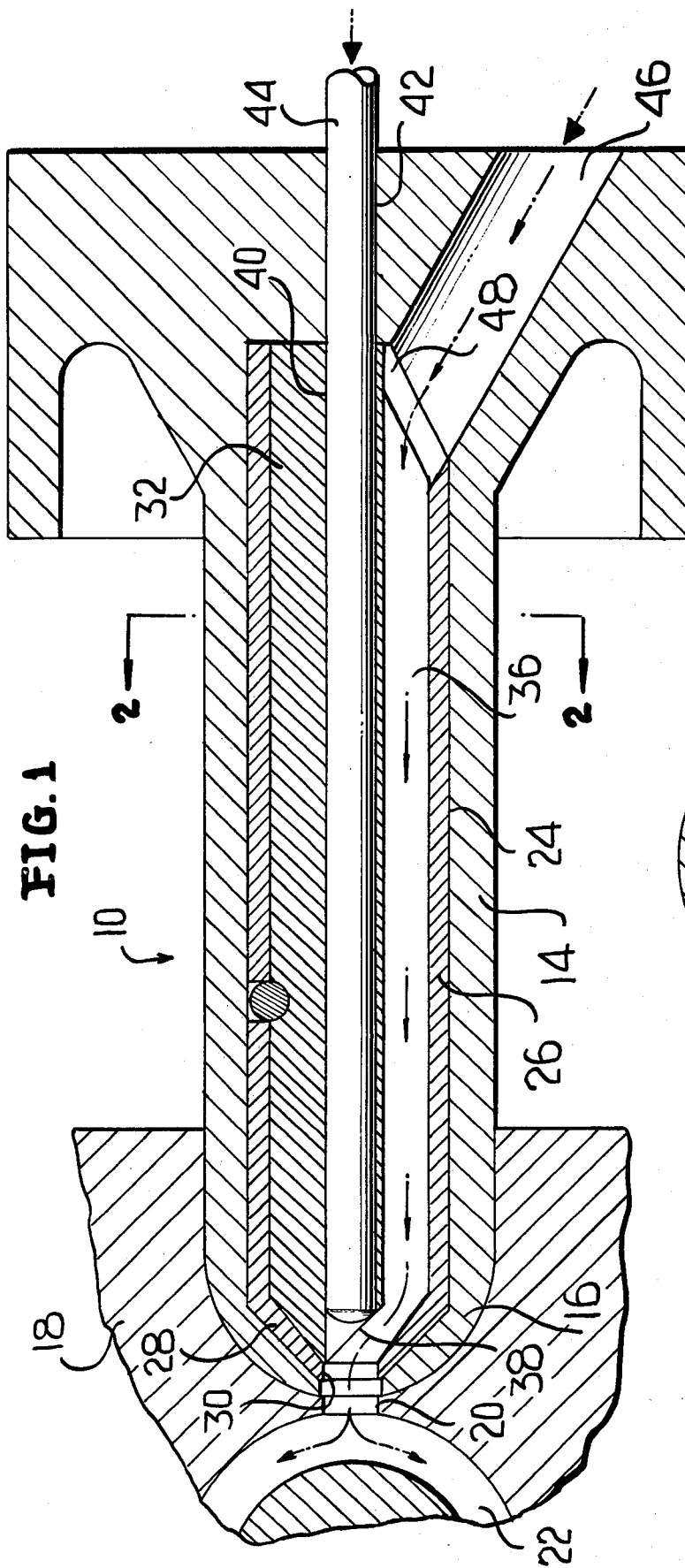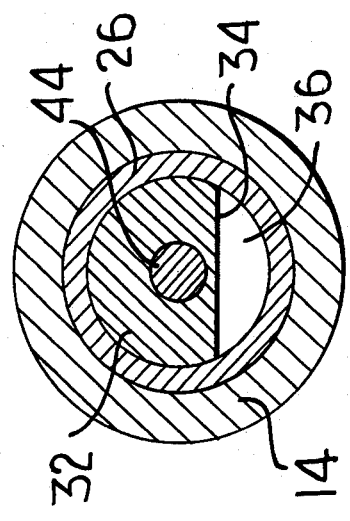

OFFSET FLOW INJECTION NOZZLE

This invention relates in general to new and useful improvements in injection nozzles for effecting and controlling the flow of plastic material from a plasticizer to an injection mold.

In the past, injection nozzles having a valve mechanism have been so constructed wherein flow therethrough is divided and then reconstituted into a single path. The net result is that there are interfaces which form weld lines which are highly undesirable.

In accordance with this invention, there is provided an injection nozzle having a flow passage which is offset to one side of the center of the nozzle whereby the flow passage for the plastic through the nozzle is a continuous and undivided one wherein there are no interfaces formed nor resultant welds.

Most particularly, the flow passage is defined by a flat on a combined support and guide member for the valve gate pin with the support and guide member having its terminal end sloping or tapered so that the flow at the end of the combined support and guide member into the delivery orifice for the plastic is unimpeded.

Another feature of the invention is that the valve gate pin is fully guided for the full length thereof so that it is not free to deflect or otherwise move offcenter which damages the cavity gate.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a longitudinal sectional view taken through the center of an injection nozzle formed in accordance with this invention.

FIG. 2 is a transverse sectional view taken generally along the line 2—2 of FIG. 1.

Referring now to the drawings in detail, it will be seen that there is illustrated an injection nozzle formed in accordance with this invention, the injection nozzle being generally identified by the numeral 10. The injection nozzle 10 is intended to be mounted in a manifold (not shown) which leads from a plasticizer. The nozzle 10 includes a conventional nozzle housing 12 which is utilized in the mounting of the nozzle in such manifold.

A nozzle body 14 is formed integrally with the nozzle housing 12 and extends therefrom, as is best shown in FIG. 1. The nozzle body 12 is in the form of a sheel-like member and is provided with a rounded free end portion 16 for seating in an injection mold 18 in sealed engagement with respect to a sprue 20 of the mold leading into a mold cavity 22.

It is to be understood that the nozzle thus described is conventional. The nozzle body 14 defines a cavity 24 which extends into the nozzle housing 12. The cavity 24 has seated therein a shell 26 which conforms generally to the external outline of the nozzle body 12 and includes an end 28 remote from the nozzle housing 12. The end 28 has an opening 30 therethrough which defines a delivery orifice.

The shell 26, in turn, has positioned therein a combined support and guide member 32 which is in the form of a plug. The combined support and guide member 32 is provided with a flat surface 34, as shown in FIG. 2, so as, in combination with the shell 26, to define a flow passage 36 for plastic material which is to be injected into the mold cavity 22. It is also to be noted that the free end of the combined support and guide member 32 is tapered as at 38 in FIG. 1 so that the passage 36 extends in an uninterrupted manner across the full face of the delivery orifice 30.

The combined support and guide member 32 is provided with a central axial bore 40 therethrough which is aligned with a bore 42 through the nozzle housing 12. A valve gate pin 44 is mounted in the bores 40, 42 and, in its retracted position as shown in FIG. 1, is clear of plastic which flows through the passage 36 into and out of the delivery orifice 30. The valve gate pin 44 is movable by conventional means (not shown) in an axial direction so as to cooperate with the valve gate of which the delivery orifice 30 is a part to effect a closing of the nozzle against material discharge.

In order that plastic material from the manifold may be directed into the flow passage 36, there is a flow passage 46 through the nozzle housing 12. Further, a corner portion 48 of the shell 26 is cut away to permit plastic flow into the interior of the shell.

It is to be understood that the combined support and guide member 32 is formed in the normal manner and thereafter the flat 34 is readily machined thereon. The relative sizes or cross sections of the shell 26 and the combined support and guide member 32 are such that the passage 36 is of a cross section sufficient to handle the required plastic flow.

It is first of all pointed out here that the construction of the nozzle 10 permits the plastic flow through the nozzle to be in a unitary path without any division or interruption, with the result that there is no separation of the plastic material and the later joining thereof in a weld interface. The elimination of this customary weld interface is the main feature of this invention.

It is to be noted that although there is an uninterrupted passage for the plastic through the nozzle, the valve gate pin 44 is supported for the full length thereof so that it cannot move to an offcenter position and thus damage the cavity gate. Although an end portion of the combined support and guide member 32 is cut away adjacent the nozzle end, it is to be noted that the valve gate pin 44 is backed up at all times in the direction which it would be moved by the flowing plastic material.

Although only a preferred embodiment of the invention has been specifically illustrated and described herein, it is to be understood that minor variations may be made in the nozzle construction without departing from the spirit and scope of the invention as defined by the appended claims.

I claim:

1. An injection nozzle for effecting and controlling the flow of plastic material in melt form from a plasticizer to an injection mold, said nozzle comprising a hollow nozzle body having an end portion for seating in sealed relation in an injection mold, an axial delivery orifice opening through said body one end from the interior of said nozzle body, an axially positioned valve gate pin for selectively closing said delivery orifice, a separately formed combined support and guide member in said nozzle body mounting said valve gate pin for axial movement between a projected position closing said delivery orifice and a retracted position within said nozzle body spaced from said delivery orifice, and a unitary supply passage extending uninterruptedly through said nozzle body to said delivery orifice when said valve gate pin is in its retracted position whereby separation of and rejoining of flowing plastic material within said injection nozzle does not occur, said supply passage being disposed entirely to one side of said combined support and guide member.

2. An injection nozzle according to claim 1 wherein said combined support and guide member has a tapered end leading transversely of said valve gate pin and across said delivery orifice.

3. An injection nozzle according to claim 1 wherein said supply passage is in part defined by a flat on said combined support and guide member.

4. An injection nozzle according to claim 1 wherein said combined support and guide member is received in a shell having formed therein said delivery orifice.

5. An injection nozzle according to claim 4 wherein said supply passage is in part defined by a flat on said combined support and guide member and in part by said shell.

6. An injection nozzle according to claim 5 wherein said combined support and guide member has a tapered end leading transversely of said valve gate pin and across said delivery orifice.

7. An injection nozzle according to claim 4 wherein a portion of said nozzle body is in the form of an outer shell receiving said first mentioned shell as an inner shell.

8. An injection nozzle for effecting and controlling the flow of plastic material in melt form from a plasticizer to an injection mold, said nozzle comprising a hollow nozzle body having an end portion for seating in sealed relation in an injection mold, an axial delivery orifice opening through said body one end from the interior of said nozzle body, an axially positioned valve gate pin for selectively closing said delivery orifice, combined support and guide means in said nozzle body mounting said valve gate pin for axial movement between a projected position closing said delivery orifice and a retracted position within said nozzle body spaced from said delivery orifice, and a unitary supply passage extending uninterruptedly through said nozzle body to said delivery orifice when said valve gate pin is in its retracted position whereby separation of and rejoining of flowing plastic material within said injection nozzle does not occur, said supply passage being disposed entirely to one side of said combined support and guide means, and said combined support and guide means having a tapered end leading transversely of said valve gate pin and across said delivery orifice, said support and guide means providing support for said valve gate pin for the full length of said valve gate pin.

* * * * *